US012399483B2

(12) United States Patent
Roy et al.

(10) Patent No.: US 12,399,483 B2
(45) Date of Patent: Aug. 26, 2025

(54) SYSTEMS AND METHODS FOR SYSTEM OPTIMIZATION AND/OR FAILURE DETECTION

(71) Applicant: SEMICONDUCTOR COMPONENTS INDUSTRIES, LLC, Phoenix, AZ (US)

(72) Inventors: Avery Joseph Roy, Indianapolis, IN (US); E. William Cowell, III, Portland, OR (US); Luiz Henrique Stival, St. Joseph, MI (US); Tirthajyoti Sarkar, Fremont, CA (US); Robert L. Brennan, Kitchener (CA)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 525 days.

(21) Appl. No.: 17/038,583

(22) Filed: Sep. 30, 2020

(65) Prior Publication Data
US 2021/0116888 A1   Apr. 22, 2021

Related U.S. Application Data

(60) Provisional application No. 62/923,635, filed on Oct. 21, 2019.

(51) Int. Cl.
*G05B 19/4155*   (2006.01)
*G06N 3/08*   (2023.01)
*G06N 20/00*   (2019.01)

(52) U.S. Cl.
CPC ........... *G05B 19/4155* (2013.01); *G06N 3/08* (2013.01); *G06N 20/00* (2019.01); *G05B 2219/34206* (2013.01)

(58) Field of Classification Search
USPC ........................................ 700/28
See application file for complete search history.

(56) References Cited

U.S. PATENT DOCUMENTS

| 4,426,609 A * | 1/1984 | Nagy | H02P 23/26 |
| | | | 318/729 |
| 2002/0053889 A1* | 5/2002 | Gold | H02K 19/36 |
| | | | 318/154 |
| 2004/0155538 A1* | 8/2004 | Kalsi | H02K 19/38 |
| | | | 310/52 |
| 2004/0267395 A1* | 12/2004 | Discenzo | H04L 67/12 |
| | | | 702/182 |
| 2006/0038525 A1* | 2/2006 | Kishida | G01R 31/2887 |
| | | | 318/649 |

(Continued)

OTHER PUBLICATIONS

Krohn et al., "Deep Learning Illustrated," Addison Wesley, USA (Sep. 2019).

*Primary Examiner* — Jason D Mitchell
(74) *Attorney, Agent, or Firm* — IPTechLaw (57) ABSTRACT

Implementations of a system configured for operation of a motor may include a motor controller coupled with a memory, the motor controller configured to be coupled with a motor. The motor controller may be configured to store a set of control parameters in the memory, the set of control parameters generated using a deep reinforcement learning agent and data associated with one or more parameters of the motor. The set of control parameters may be configured to define an optimized operating area for the motor.

20 Claims, 4 Drawing Sheets (56) References Cited

U.S. PATENT DOCUMENTS

| | | | |
|---|---|---|---|
| 2007/0296364 A1* | 12/2007 | Shoemaker | G05B 13/042 |
| | | | 318/561 |
| 2009/0204234 A1* | 8/2009 | Sustaeta | G05B 13/0265 |
| | | | 700/29 |
| 2012/0267681 A1* | 10/2012 | Nemoto | H01L 29/1004 |
| | | | 257/139 |
| 2016/0342182 A1* | 11/2016 | Deboy | G06F 1/305 |
| 2016/0369855 A1* | 12/2016 | Essenmacher | F16D 28/00 |
| 2017/0063284 A1* | 3/2017 | Matsumoto | G05B 13/0265 |
| 2018/0004874 A1* | 1/2018 | Lange | G06F 30/23 |
| 2018/0012137 A1* | 1/2018 | Wright | G06N 7/005 |
| 2018/0026573 A1* | 1/2018 | Akashi | H02P 29/10 |
| | | | 318/6 |
| 2018/0100662 A1* | 4/2018 | Farahmand | G05B 19/0428 |
| 2019/0227502 A1* | 7/2019 | Nakamura | G05B 13/0265 |
| 2019/0243318 A1* | 8/2019 | Shirakawa | G05B 13/0285 |
| 2020/0074297 A1* | 3/2020 | Lee | G06N 3/08 |
| 2020/0117171 A1* | 4/2020 | Takahashi | H04L 25/4902 |
| 2020/0198481 A1* | 6/2020 | Hein | B60L 53/122 |
| 2020/0287483 A1* | 9/2020 | Wystup | H02P 6/10 |
| 2020/0301376 A1* | 9/2020 | Tsuneki | G05B 13/0265 |
| 2021/0151988 A1* | 5/2021 | Milivojevic | H02J 7/35 |
| 2022/0019186 A1* | 1/2022 | De Andrade | G06N 5/02 |
| 2022/0121260 A1* | 4/2022 | King | H02J 3/007 |

\* cited by examiner

SYSTEMS AND METHODS FOR SYSTEM OPTIMIZATION AND/OR FAILURE DETECTION

CROSS REFERENCE TO RELATED APPLICATIONS

This document claims the benefit of the filing date of U.S. Provisional Patent Application 62/923,635, entitled "System and Method for Failure Detection" to Avery Joseph Roy which was filed on Oct. 21, 2019, the disclosure of which is hereby incorporated entirely herein by reference.

BACKGROUND

1. Technical Field

Aspects of this document relate generally to systems and methods, such as systems and methods for controlling various systems and system components. More specific implementations involve systems for controlling motors.

2. Background

Generally, many systems include various components that are connected to produce a given desired result. For example, in a chemical plant system, piping connects various pumps and valves together to allow materials to be introduced to and removed from a reactor vessel.

SUMMARY

Implementations of a system configured for operation of a motor may include a motor controller coupled with a memory, the motor controller configured to be coupled with a motor. The motor controller may be configured to store a set of control parameters in the memory, the set of control parameters generated using a deep reinforcement learning agent and data associated with one or more parameters of the motor. The set of control parameters may be configured to define an optimized operating area for the motor.

Implementations of a system configured for operation of a motor may include one, all, or any of the following:

The motor controller may be configured to be coupled with a telecommunication network. The telecommunication network may be configured to be operatively coupled with a cloud computing system which may be configured to include the deep reinforcement learning agent and use the deep reinforcement learning agent and the data associated with the one or more parameters of the motor to generate the set of control parameters and then communicate the set of control parameters across the telecommunication network to the motor controller for storing in the memory.

The deep reinforcement learning agent may be included in the memory and the motor controller may use the deep reinforcement learning agent and the data associated with one or more parameters of the motor to generate the set of control parameters.

The deep reinforcement learning agent may be included in the memory and may be configured to communicate with a cloud computing system over a telecommunication network coupled with the motor controller. The cloud computing system may use the data associated with one or more parameters of the motor to generate a set of agent control parameters used by the deep reinforcement agent to generate the set of control parameters associated with the optimized operating area for the motor.

The system may include two or more motor controllers each coupled with a memory and each configured to be coupled with a corresponding motor. The memory coupled with each motor controller may include a set of control parameters for that motor controller where the set of control parameters define an optimized operating area for the corresponding motor. The set of control parameters for each motor controller may be determined by executing a second deep reinforcement learning agent using data associated with one or more parameters of each motor associated with each motor controller.

The deep reinforcement learning agent may be one of a deep Q-network, a double deep Q-network, an Actor-Critic agent, a policy gradient agent, a Monte Carlo tree search agent, an imitation learning agent, or any combination thereof.

The deep reinforcement learning agent may be generated using a deep neural network and a Markov decision process.

A power factor controller may be coupled with the motor controller.

The power factor controller and the motor controller may communicate bidirectionally.

The motor controller may use the set of control parameters to provide one or more instructions to the power factor controller.

Implementations of a method of controlling a motor may include: providing a motor controller coupled with a memory, the motor controller configured to be coupled with a motor; and storing a set of control parameters in the memory, the set of control parameters generated using a deep reinforcement learning agent and data associated with one or more parameters of the motor. The set of control parameters may be configured to define an optimized operating area for the motor.

Implementations of a method of controlling a motor may include one, all, or any of the following:

The motor controller may be configured to be coupled with a telecommunication network. The telecommunication network may be configured to be operatively coupled with a cloud computing system which may be configured to include the deep reinforcement learning agent and use the deep reinforcement learning agent and the data associated with the one or more parameters of the motor to generate the set of control parameters and then communicate the set of control parameters across the telecommunication network to the motor controller for storing in the memory.

The deep reinforcement learning agent may be included in the memory and the motor controller uses the deep reinforcement learning agent and the data associated with one or more parameters of the motor to generate the set of control parameters.

The deep reinforcement agent may be included in the memory and may be configured to communicate with a cloud computing system over a telecommunication network coupled with the motor controller where the cloud computing system uses the data associated with one or more parameters of the motor to generate a set of agent control parameters used by the deep reinforcement agent to generate the set of control parameters associated with the optimized operating area for the motor.

The method implementations may include at least a second deep reinforcement agent configured to use the set of agent control parameters to generate a portion of the set of control parameters associated with the optimized operating area for the motor.

The deep reinforcement learning agent may be one of a deep Q-network, a double deep Q-network, an Actor-Critic agent, a policy gradient agent, a Monte Carlo tree search agent, an imitation learning agent, or any combination thereof.

The deep reinforcement learning agent may be generated using a deep neural network and a Markov decision process.

The power factor controller may be coupled with the motor controller.

The power factor controller and the motor controller may communicate bidirectionally.

The motor controller may use the set of control parameters to provide one or more instructions to the power factor controller.

Implementations of a method of optimization and failure prediction for a system may include providing a motor controller coupled with a memory, the motor controller configured to be coupled with a motor; and storing a set of control parameters in the memory, the set of control parameters generated using a deep reinforcement learning agent and data associated with one or more parameters of the motor. The set of control parameters may be configured to define an optimized operating area for the motor.

Implementations of a method of optimization and failure prediction for a system may include one, all, or any of the following:

The motor controller may be configured to be coupled with a telecommunication network. The telecommunication network may be configured to be operatively coupled with a cloud computing system which may be configured to include the deep reinforcement learning agent and use the deep reinforcement learning agent and the data associated with the one or more parameters of the motor to generate the set of control parameters and then communicate the set of control parameters across the telecommunication network to the motor controller for storing in the memory.

The deep reinforcement learning agent may be included in the memory and the motor controller may use the deep reinforcement learning agent and the data associated with one or more parameters of the motor to generate the set of control parameters.

The deep reinforcement agent may be included in the memory and may be configured to communicate with a cloud computing system over a telecommunication network coupled with the motor controller where the cloud computing system uses the data associated with one or more parameters of the motor to generate a set of agent control parameters used by the deep reinforcement agent to generate the set of control parameters associated with the optimized operating area for the motor.

Method implementations may include at least a second deep reinforcement agent configured to use the set of agent control parameters to generate a portion of the set of control parameters associated with the optimized operating area for the motor.

The deep reinforcement learning agent may be a deep Q-learning network.

The deep reinforcement learning agent may be generated using a deep neural network and a Markov decision process.

The power factor controller may be coupled with the motor controller.

The power factor controller and the motor controller may communicate bidirectionally.

The motor controller may the set of control parameters to provide one or more instructions to the power factor controller.

The deep reinforcement learning agent may provide one or more instructions to the power factor controller.

The power factor controller may provide one or more instructions to the motor controller in response to a line power event and the motor controller may be configured to use the one or more instructions and the set of control parameters to maintain the motor's operation in the optimized operating area.

The one or more parameters of the motor may be one of: incoming electrical voltage to the motor, alignment of current phases to the motor, alignment of voltage phases to the motor, incoming electrical voltage to a power factor controller, alignment of current phases from an electrical panel coupled with a power factor controller, alignment of voltage phases from an electrical panel coupled with a power factor controller, ambient temperature, ambient humidity, motor phase voltages, motor current per voltage phase applied to the motor, calculated instantaneous phase power from the controller, motor speed, motor acceleration rate, motor torque, position of a rotor included in the motor, position of a stator included in the motor, temperature of a magnet included in a rotor included in the motor, magnetic field of a magnet included in a rotor included in the motor, temperature of a casing of the motor, mechanical vibration of a casing of the motor, mechanical vibration of a shaft of the motor, airflow speed adjacent to the motor, fluid pressure surrounding the motor, winding temperature of the motor, motor power factor, motor stator winding temperature, a temperature of a power semiconductor device included in the motor, a position of a rotor relative to a stator, or any combination thereof.

The deep neural network may include an input set of neurons, each neuron of the input set of neurons corresponding with a sensed input from the motor; three or more fully interconnected hidden layers of neurons; and a softmax output layer where the softmax output layer may be configured to determine a probability that a sensed input from the motor may be within the optimized operating area or not within the optimized operating area.

The deep neural network further may include one of: a cost function configured to optimize a control surface corresponding with motor electrical efficiency; a cost function configured to optimize a control surface corresponding with system electrical efficiency; a cost function configured to predict failure of one or more components of the motor; or a cost function configured to optimize reliability of one or more components of the motor.

The one or more components may be one of a bearing, a shaft, a fan bearing, a winding, a power semiconductor device, a switch, a wire, a motor controller, a shaft, or any combination thereof.

The deep reinforcement learning agent may be one of a deep Q-network, a double deep Q-network, an Actor-Critic agent, a policy gradient agent, a Monte Carlo tree search agent, an imitation learning agent, or any combination thereof.

The deep reinforcement learning agent may include one or more Q-value functions.

The deep reinforcement learning agent uses ensemble modeling to generate the set of control parameters.

Implementations of the method may include two or more motor controllers each coupled with a memory and each configured to be coupled with a corresponding motor; The memory coupled with each motor controller may include a set of control parameters for that motor controller where the set of control parameters define an optimized operating area for the corresponding motor where the set of control parameters for each motor controller may be determined by executing a second deep reinforcement learning agent using data associated with one or more parameters of each motor associated with each motor controller.

The one or more parameters of each motor may be one of: incoming electrical voltage to each motor, alignment of current phases to each motor, alignment of voltage phases to each motor, incoming electrical voltage to a power factor controller, alignment of current phases from an electrical panel coupled with a power factor controller, alignment of voltage phases from an electrical panel coupled with a power factor controller, ambient temperature, ambient humidity, motor phase voltages for each motor, motor current per voltage phase applied to each motor, calculated instantaneous phase power from the motor controller for each motor, each motor's speed, each motor's acceleration rate, each motor's torque, position of a rotor included in each motor, position of a stator included in each motor, temperature of a magnet included in a rotor included in each motor, magnetic field of a magnet included in a rotor included in each motor, temperature of a casing of each motor, mechanical vibration of a casing of each motor, mechanical vibration of a shaft of each motor, airflow speed adjacent to each motor, fluid pressure surrounding each motor, winding temperature of each motor, each motor's power factor, each motor's stator winding temperature, a temperature of a power semiconductor device included in each motor, a position of a rotor relative to a stator of each motor, or any combination thereof.

The second deep reinforcement learning agent may be generated using a deep neural network and a Markov decision process. The deep neural network may include an input set of neurons, each neuron of the input set of neurons corresponding with a sensed input from the motor; three or more fully interconnected hidden layers of neurons; and a softmax output layer where the softmax output layer may be configured to determine a probability that a sensed input from each motor may be within the optimized operating area or not within the optimized operating area for each motor.

The deep neural network further may include one of: a cost function configured to optimize a control surface corresponding with each motor's electrical efficiency; a cost function configured to optimize a control surface corresponding with all motors' electrical efficiency; a cost function configured to predict failure of one or more components of each motor; or a cost function configured to optimize reliability of one or more components of each motor.

The one or more components may be one of a bearing, a shaft, a fan bearing, a winding, a power semiconductor device, a switch, a wire, a motor controller, a shaft, or any combination thereof.

The second deep reinforcement learning agent may be one of a deep Q-network, a double deep Q-network, an Actor-Critic agent, a policy gradient agent, a Monte Carlo tree search agent, an imitation learning agent, or any combination thereof.

The second deep reinforcement learning agent may include one or more Q-value functions.

The second deep reinforcement learning agent may use ensemble modeling to generate each set of control parameters for each motor controller.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended systems for optimization and/or control of a system will become apparent for use with particular implementations from this disclosure. Accordingly, for example, although particular implementations are disclosed, such implementations and implementing components may comprise any shape, size, style, type, model, version, measurement, concentration, material, quantity, method element, step, computing architecture, computing substrate, and/or the like as is known in the art for such systems for optimization and/or control of a system, and implementing components and methods, consistent with the intended operation and methods.

Figure 1:
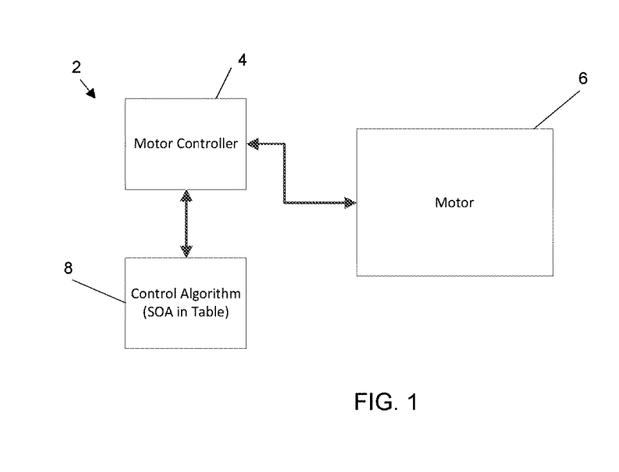
FIG. 1 is a block diagram view of an implementation of a motor control system motor control system employing an set of operating parameters in memory.

Referring to FIG. 1, an implementation of a motor control system 2 is illustrated. While the various examples provided in this system involve motor control systems, the principles disclosed herein may be employed with a variety of other control systems used to control other components of different systems, such as, by non-limiting example, valves, compressors, sensors, hydraulics, power semiconductor devices, power semiconductor systems, or any other system component. As illustrated, the motor control system 2 includes a motor controller 4 that is designed to connect/couple with motor 6. The motor controller 4 is coupled with or includes memory 8 that contains a control algorithm designed to enable the motor controller to send control commands/control various inputs to the motor 6. The memory may be any type of volatile or non-volatile memory, on-board or externally attached, including, by non-limiting example, random access memory (RAM), read only memory (ROM), electrically erasable read only memory (EEPROM), flash memory, magneto-resistive random access memory, or any other memory type.

A power factor controller may be coupled with the motor controller. The power factor controller and the motor controller communicate bidirectionally (this will be discussed in greater detail later in this document). The motor controller may be coupled with a motor. The deep reinforcement agent may be included in the memory and is configured to communicate with a cloud computing system over a telecommunication network coupled with the motor controller where the cloud computing system uses the data associated with one or more parameters of the motor to generate a set of agent control parameters used by the deep reinforcement agent to generate the set of control parameters associated with the optimized operating area (OOA) for the motor.

A wide variety of motor types employing a corresponding wide variety of motor control algorithms/processes may be utilized in the various system implementations disclosed herein. In various system implementations, the motor type may be, by non-limiting example, a direct current (DC) motor, an alternating current (AC) motor, a permanent magnet DC motor (PMDC), a wound field DC motor, a series-wound DC motor, a shunt-wound DC motor (SWDC), a compound DC motor, an asynchronous AC motor, a synchronous AC motor, a 3-phase induction AC motor (ACIM), a 1-phase induction AC motor (ACIM), a permanent split capacitor AC motor, a split phase AC motor, a shaded pole AC motor, a stepper motor, a switched reluctance AC motor, a hysteresis AC motor, a brushless DC motor (BLDC), a permanent magnet synchronous motor (PMSM), and any other electric motor type. In other implementations, however, the motor being controlled by the motor controller may be powered directly by another energy source other than electricity, such as, by non-limiting example, gasoline, diesel, fuel oil, natural gas, propane, hydrogen, hydrogen fuel cells, momentum, thermal energy, chemical reaction energy, battery cells, geothermal energy, hydroelectric energy, wind energy, or any other energy source.

In various implementations, the particular motor controller may be any of a wide variety of electronic devices and systems, including, by non-limiting example, a logic circuit, a digital logic circuit, an analog logic circuit, a microprocessor, a microcontroller, an application specific integrated circuit (ASIC), a field programmable gate array (FPGA), a processor, a digital signal processor, or any other electronic system capable of being used to provide instructions to and/or control parameters used during operation of the motor. The particular type of motor controller employed in various system implementations may depend on the type of control algorithm/process being employed. For example, where trapezoidal control algorithms are employed, the use of a 20 MHz clock speed microprocessor may be utilized. Where more complex control algorithms are employed, as in field oriented control, a microprocessor with 70 MHz to 100 MHz clock speed may be chosen. Other processor types and other higher and lower clock speeds may be employed in various implementations.

A wide variety of control algorithms may be integrated with the various system control methods and may be stored in machine readable instructions on the memory 8. These may be, by non-limiting example, trapezoidal control, sinusoidal control, field oriented control, sensored trapezoidal control, sensorless trapezoidal control, sensored sinusoidal control, sensorless sinusoidal control, direct torque control (DCT), field oriented control with Clarke and Park transforms, space vector modulation, or any other control algorithm. The control algorithm generally is selected based on the type of motor being controlled and the type of energy source powering the motor and/or the application for the motor. The control algorithm is executed by the motor controller using data stored in the memory 8 with the machine readable instructions that include the control algorithm. In various implementations, the data is in the form of a table (which may, in some implementations be a look up table (LUT)) of values that contain parameters/coefficients/elements for the control algorithm that permit the motor controller to successfully issue commands to the motor, control inputs to the motor, or determine an operating state of the motor 6. In other implementations, however, a look up table may not be used, and the parameters/coefficients/elements may be included in the memory for direct retrieval or may be otherwise included in computer readable instructions that form, by non-limiting example, a control law, database, list of parameters, parameter table, control relationship, a model, or any other type of instructions capable of execution/use by the motor controller.

In the system 2 implementation illustrated in FIG. 1, the motor controller 4 controls the motor 6 using the control algorithm and control parameters stored in the memory 8. In this system, the values of the control parameters in the table are determined using engineering calculations and define a safe operating area (SOA) for the particular motor being controlled. The safe operating area, as used herein, represents a set of operating conditions for the motor 6 that protect safety of the motor, safety of equipment connected to the motor, and/or safety of human life around or that depends on the operation of the motor. Because the safe operating area of the motor is determined by engineering calculations (predetermined in some implementations) and the motor controller 4 itself is not programmed to change any of the control parameters in the memory 8, the system 2 is static and cannot be optimized for either efficiency or reliability once installed. Only a manual changing of the control parameters in the table following installation can allow the SOA to be adjusted and any efficiency and/or reliability improvements implemented. Also, because the SOA values are determined by engineering calculations, the performance and/or reliability and any performance/reliability tradeoffs for the system 2 cannot be tuned or adjusted to any particular characteristics of specific motor or the specific conditions in which the motor is being used or the system installed after installation.

Figure 2:
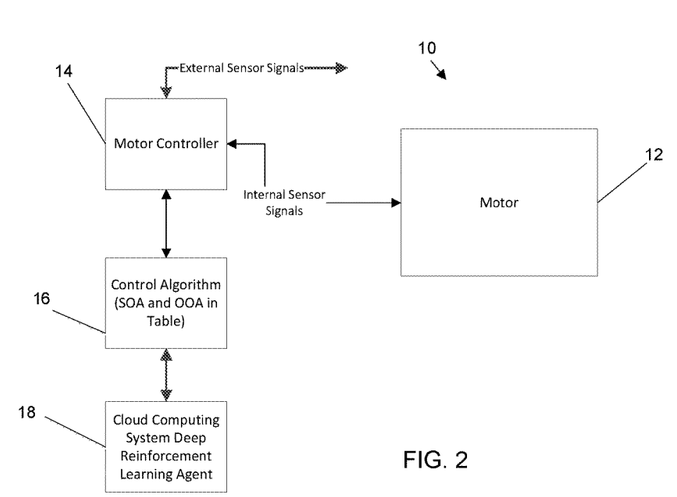
FIG. 2 is a block diagram view of an implementation of a motor control system employing an set of operating parameters in memory for the motor related to an optimized operating area for the motor showing various sensor inputs.

Referring to FIG. 2, another implementation of a control system 10 is illustrated. Like the system 2 previously discussed, in the system 10, a motor 12 is being controlled by motor controller 14 coupled with memory 16 that includes a control algorithm. However, in this system the parameters stored in the table are determined in part by a deep reinforcement learning agent included in a cloud computing system 18 that is coupled to the motor controller 14 through a telecommunication network. In various implementations, the telecommunication network may be, by non-limiting example, a virtual private cloud, a wireless communication system, a wired communication system, serial communication, an Ethernet communication system, a cellular telephone communication system, the internet, WiFi, ZIGBEE, BLUETOOTH, or any other wired or wireless system or protocol for transmitting data information. As illustrated in FIG. 2, various external sensor signals and internal sensor signals are received as data associated with various parameters of the motor (the motor's operating state) and stored in the memory 16 and then transmitted across the telecommunication channel to the cloud computing system 18. This data transmission may begin after the system 10 has been fully formed through installation of the motor 12, the motor controller 14, and the memory 16 in a particular operating environment. Initially, the control parameters in the memory 16 may be just those associated with establishing an SOA for the motor 12 so that it can safely operate in the newly installed particular operating environment while data is being gathered.

In various system implementations, following system installation, the cloud computing system 18 uses the data relating to the various parameters of the motor 12 to train the deep reinforcement learning agent stored as machine readable instructions in memory associated with the various processors included in the cloud computing system 18. Once the deep reinforcement learning agent has been trained using the data, as will be described in more detail hereafter, the deep reinforcement learning agent then generates one or more control parameters that the cloud computing system 18 then transmits across the telecommunication channel and the motor controller 14 stores in the memory 16 as part of the table in various implementations. These control parameters are those that, if implemented by the motor controller 14, will lead to the most favorable actions or actions pertaining to an optimal policy established by the deep reinforcement learning process. These one or more control parameters (set of control parameters) from the deep reinforcement learning agent define an optimized operating area (OOA) for the motor 12. As used herein, an optimized operating area (OOA) is a set of operating states/conditions for the motor 12 that optimize various aspects of the motor's performance, such as, by non-limiting example, motor efficiency, motor reliability, motor performance, or any other desired aspect of motor performance. In various implementations, the OOA may always be within the operating area of the SOA; in other implementations, however, one or more portions of the OOA may extend beyond or outside the SOA. By non-limiting example, for a motor whose SOA indicates that, during operation, the motor can draw a maximum of 50 A, the deep reinforcement learning agent may generate an OOA that allows the motor to draw up to 55 A because the motor is installed in a high load condition outside in a location where the ambient temperature never exceeds 70 F. Because of this, the motor can run hotter as a result of drawing more amperes than it could in conditions where the motor was installed in a location where outside temperatures can reach in excess of 120 F. In this way, the deep reinforcement learning agent is able to adapt the operating parameters to allow the motor to run as optimally in its particular installed environment and conditions.

In the implementation illustrated in FIG. 2, the system 10 operates by using the cloud computing resource 18 entirely to train and execute the deep reinforcement learning agent. This may be advantageous where the computations and memory requirements needed to train and/or execute the deep reinforcement agent are beyond the processing capabilities of the motor controller 14 and/or memory 16. However, as will be described herein, deep reinforcement learning agents may be incorporated into the memory associated with motor controllers in various ways.

The data inputs used by the cloud computing system to train and operate the deep reinforcement learning agent may be drawn from various sensors coupled to the motor or used to detect environmental parameters. The types of parameters tracked may include, by non-limiting example, incoming electrical voltage to the motor, alignment of current phases to the motor, alignment of voltage phases to the motor, incoming electrical voltage to a power factor controller, alignment of current phases from an electrical panel coupled with a power factor controller, alignment of voltage phases from an electrical panel coupled with a power factor controller, ambient temperature, ambient humidity, motor phase voltages, motor current per voltage phase applied to the motor, calculated instantaneous phase power from the controller, motor speed, motor acceleration rate, motor torque, position of a rotor comprised in the motor, position of a stator comprised in the motor, temperature of a magnet comprised in a rotor comprised in the motor, magnetic field of a magnet comprised in a rotor comprised in the motor, a magnetic field of a component in the motor, a magnetic field in the motor, temperature of a casing of the motor, mechanical vibration of a casing of the motor, mechanical vibration of a shaft of the motor, airflow speed adjacent to the motor, fluid pressure surrounding the motor, winding temperature of the motor, motor power factor, motor stator winding temperature, a temperature of a power semiconductor device comprised in the motor, control board temperature, control board component temperature, control board vibration, control board component vibration, motor controller temperature, motor controller vibration, a position of a rotor relative to a stator, any combination thereof, or any other desired sensable parameter that could affect the performance of the motor 12 where it is installed. Because a deep reinforcement learning agent is employed to develop the set of control parameters that define the OOA, the combinatorial effect of one, all, or any of the data from the sensors can be evaluated when determining the OOA control parameter set without requiring predetermining of the parameters or using engineering calculations based on physical laws to assess the combinatorial effects. This is because the use of deep learning/machine learning facilitates discovering an optimized control solution without having to rely on solving or determining all of the a priori relationships between all of the various sensed data values. While the use of deep learning/machine learning does not guarantee the discovery of every optimal solution, use of the technique can permit finding an optimal solution within the search space quickly and efficiently. In this document, the deep learning techniques are used to generate functions that are then used by the system components in calculating the optimal solutions in the form of sets of control parameters.

In FIG. 2, the arrows associated with the indicator lines for the External Sensor Signals and the Internal Sensor Signals illustrate that bidirectional communication between the motor controller 14 and the sensors may occur in various implementations. Where bidirectional communication with the sensors is used, this allows the system to work to optimize the sensor loop in addition to/in order to develop the OOA control parameters themselves. By non-limiting example, when a motor is run at low speed under a light load, the sensitivity of the internal sensors observing each phase current drawn by the motor during operation can be increased using an operational amplifier in the internal sensors (or in the motor controller itself in some implementations) thus allowing the sensors to report better phase current data to the motor controller. As a result, the better phase current data is now correspondingly available to the deep reinforcement learning agent for development of the OOA, and can improve the efficiency/reliability of the overall system as a result. This principle can be employed in areas other than in motors. By non-limiting example, where the system involves regulating/analyzing audio, the sound sensor may be bidirectionally adjusted between loud regions and soft regions of the sound being regulated. Additional logic may be implemented to ensure the adjustment takes place at the appropriate time/in response to the shift between loud and soft to ensure that the sensor's output changes enough to prevent the system from facing an unobservable/uncontrollable point in operation where neither the SOA nor the OOA control parameters can allow the sound controller to regulate operation. In some implementations, instead of bidirectionally adjusting gain or sensitivity, the adjustment may be to a timing rate or sampling rate which results in a desired change in the sensitivity to changes in the observed data signal. In this way, as used herein, when the term "sensor" is employed, it includes the signal transducer component of a physical sensor device plus a signal conditional component, whether that signal conditioning component is physically incorporated in the signal transducer or in the controller/component that receives the data signal from the signal transducer itself.

In various implementations, the deep reinforcement learning agent may be implemented using a deep neural network executed by the cloud computing system 18. In various implementations, the deep neural network may include an input set of neurons. Each neuron of the input set of neurons may correspond with a sensed input from the motor. The deep neural network then includes at least three or more fully interconnected hidden layers of neurons. The deep neural network may include a softmax output layer designed to evaluate a probability that a sensed input (or some combination of multiple sensed inputs) from the motor is within the optimized operating area or not within the optimized operating area. As the deep neural network is trained, its ability to determine the scope of the optimized operating area is increased. Increasing the deep neural network's ability to determine the scope of the optimized operating area may be carried out by using, by non-limiting example, a cost function designed to optimize a control surface corresponding with motor electrical and/or performance efficiency, a cost function designed to optimize a control surface corresponding with system electrical and/or performance efficiency, a cost function designed to predict failure of one or more components of the motor and/or system, a cost function designed to optimize reliability of one or more components/outputs of the motor and/or system, or any other cost function type. The various motor components/outputs that may be subject to optimization using the cost function may include, by non-limiting example, a bearing, electrical insulation, electromagnetic emissions, a fan bearing, a winding, a power semiconductor device, a switch, a wire, a motor controller, a shaft, or any combination thereof.

In some system implementations, the use of deep reinforcement learning may not be needed. In these implementations, no agent may be needed to generate the set of control parameters associated with the OOA; rather a deep neural network can be used to generate a function that can be used to directly calculate the set of control parameters of the OOA itself, without further need for agent decision making as described further in this document. In these implementations, the deep neural network may be implemented in the form of a standalone deep learning block implemented in the cloud computing system or motor controller. The deep learning block may be periodically executed to allow for recalculation of the set of control parameters associated with the OOA in some implementations. In others, however, once the system has been installed and sufficient data collected, the deep learning block may be executed just once to determine the set of control parameters for the OOA.

The deep reinforcement learning agent may employ a Markov decision process in various implementations. In such a process, the system assumes that the state of the system at the current time contains all of the information needed about the state of the system from all previous points in time. In the Markov decision process, during training, each individual possible state is evaluated in combination with the set of all possible actions that could be taken in the system at a given point in time. The reward for each possible state-action pair is then calculated to form a reward distribution. A transition probability distribution is also calculated that determines the probability of transitioning to a desired state-action pair by taking a particular action at the current particular state. A discount factor is used as a hyperparameter (discount factor) in the model to allow the deep reinforcement learning agent to evaluate the reward for achieving states a certain number of states into the future (whether the reward of a particular state now is worth X versus the reward of that same state 20 points in time later being worth 0.2X). During training, the Markov decision process is used with the data to develop a function that can be used by the agent to take the appropriate action in any given state the system encounters (the function is able to map the states to the corresponding action that maximizes the rewards). The function is referred to as a policy function. During learning, the agent is trained to maximize the possible discounted future reward to the particular policy function determined to best map all of the possible states to the corresponding actions. The resulting trained function (known as an objective function) is what is used with the data by the deep neural network and the cloud computing system for optimization activity.

In various method and system implementations disclosed herein, Q-value functions may also be employed in the training of the model where the Q-value function determines the reward of taking a particular action where that action is paired with a particular state. When Q-value functions are employed, the deep neural network calculates estimates of the optimal Q-values for each state-action pair. The resulting network is referred to as a deep Q-learning network (DQN) in various implementations, which is a type of deep reinforcement learning agent like those disclosed herein. However, various implementations of deep reinforcement learning agents may utilize other agents different from DQN agents, such as, by non-limiting example, double DQN agents (double deep Q-networks), Actor-Critic agents, policy gradient agents, Monte Carlo tree search agents, an imitation learning agent, any combination thereof, or any other agent type designed to use value to assess the utility of state-action pairs. A wide variety of deep reinforcement learning agents may be employed and constructed using the principles disclosed in this document.

In the system 10 implementation illustrated in FIG. 2, the cloud computing system 18 does all of the data processing, training of the deep learning agent, and the transmitting of the set of control parameters that define the OOA to the table stored in the memory 16. Because of this, in the system 10, the motor controller 14 does not participate in the generation/creation of the OOA beyond any functions needed to transmit the training data and/or storing the set of control parameters associated with the OOA in the table. In other system implementations, however, the motor controller 14 may be involved in various ways in the process of generating and/or refining the set of control parameters that define the OOA for the system 10 in its particular installation condition.

Figure 3:
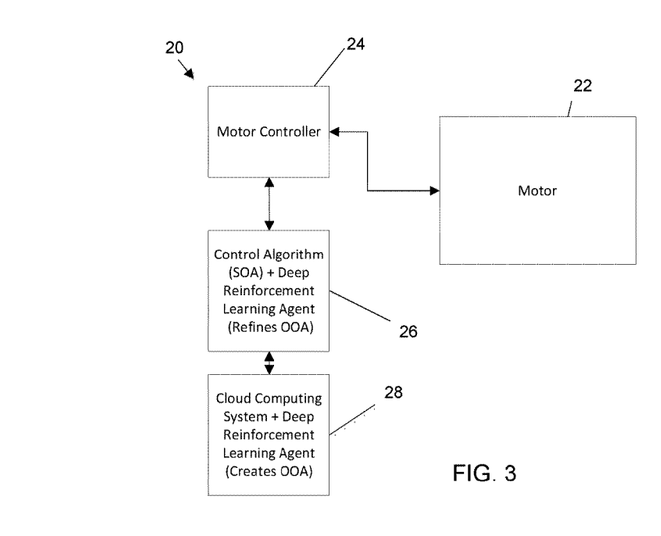
FIG. 3 is a block diagram of an implementation of motor control system where the memory includes a deep reinforcement learning agent.

Referring to FIG. 3, a system implementation 20 is illustrated that again includes motor 22, motor controller 24, and memory 26 operatively coupled together and coupled via a telecommunications network to cloud computing system 28. In this system implementation 20, the cloud computing system 28 initially receives data from the external and/or internal sensors (not shown) and trains and generates an initial deep reinforcement learning agent and set of control parameters that define an initial OOA. This initial deep reinforcement learning agent and set of control parameters are then transmitted as machine readable instructions and stored in the memory 26. The motor controller 24 then executes the initial deep reinforcement agent which then gathers a more limited set of data by conducting various perturbations to the system using any of the training and agent types disclosed herein to determine whether increased efficiency and/or reliability can be achieved by changing any of the set of control parameters to form a revised/second OOA. In some implementations, the initial deep reinforcement agent may also be updated to form a revised/second deep reinforcement agent as part of the training process. The motor controller 24 then uses the revised/second OOA in combination with the initially stored set of SOA parameters during continued operation of the motor. In various implementations, the motor controller 24 may transmit the revised/second deep reinforcement agent and/or the revised/second OOA to the cloud computing system 28 over the telecommunication network. In other implementations, however, the motor controller 14 may not transmit the updated model back to the cloud computing system 28 after the initial training period has been completed. In the system 20 illustrated in FIG. 3, the deep reinforcement learning agent works to refine the set of control parameters associated with the OOA, but does not participate in generating them initially. In other implementations, instead of refining the OOA using perturbations, the deep reinforcement learning agent in the memory may be a rules-based agent which contains simplified instructions designed to ensure the motor controller is able to remain within the OOA.

Figure 4:
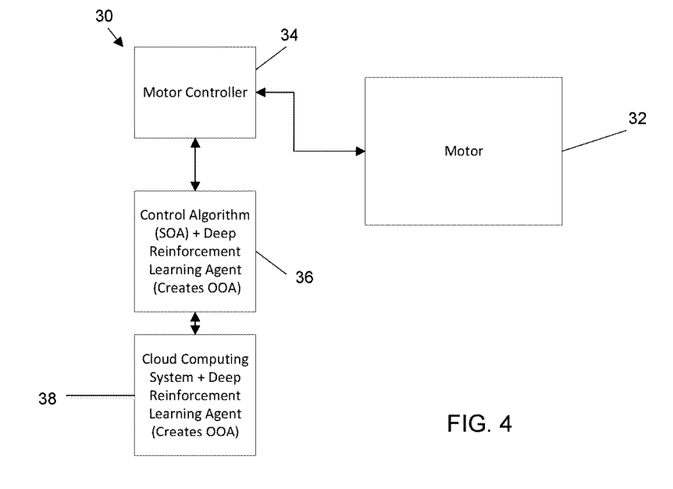
FIG. 4 is a block diagram of an implementation of a motor control system where the memory includes a deep reinforcement learning agent working with a second deep reinforcement learning agent in a cloud computing systems coupled with the motor controller.

Referring to FIG. 4, another implementation of a motor control system 30 is illustrated that also includes motor 32, motor controller 34, and memory 36 operatively coupled together with cloud computing system 38. In this system implementation 30, the memory 36 includes a first deep reinforcement learning agent executed in the memory 36 by the motor controller 34 that works with as second deep reinforcement learning agent included/created by cloud computing system 38 to generate the set of control parameters that define the OOA. In various implementations, after the OOA has been defined, the first deep reinforcement learning agent may cease to operate, and the motor controller may then use the initially generated set of control parameters for the OOA going forward. In others, like in the system 20 illustrated in FIG. 3, the first deep reinforcement learning agent may work to refine the initially generated set of control parameters that define the OOA. In various implementations, the first deep reinforcement learning agent may generate a portion of the set of control parameters associated with the OOA while the second deep reinforcement learning agent may generate the remainder of the set of control parameters. In some implementations, the first deep reinforcement learning agent and the second deep reinforcement learning agent may be used in an ensemble modeling configuration, where each agent is tasked with sequentially and/or comparatively predicting portions of the set of parameters and then voting is conducted to determine which parameters are most optimal. In the system of FIG. 4, both the motor controller 34 and the cloud computing system 38 are involved in initially creating the deep reinforcement learning agent.

While in the system implementations illustrated in FIGS. 2-4 the use of a cloud computing system 38 is used, in various system implementations, the cloud computing system 38 may not be used, and the motor controller 34 itself may use the first deep reinforcement learning agent to generate the entirety of the parameters associated with the OOA. However, because of memory and processing constraints ordinarily found with the processing power and memory size associated with motor control systems, it may generally be beneficial to offload the data storage and agent training activities to an external computing resource. While this external computing resource is described as a cloud computing system, it could be in various implementations, any other external computing resource, such as, by non-limiting example, a server, a group of servers, a laptop, a desktop, a portable computing device, a smart phone, a cell phone, a tablet, a programmable logic controller (PLC), a board-level computer, or any other general purpose or specialized computing device. Various data stores may be associated with the external computing resource including various database(es) in various implementations.

While the discussion thus far has illustrated systems that involve a single motor controller/motor pairing, the principles disclosed herein may be extended to situations involving multiple motor controller/motor pairings (or other ratios of controllers to motors). In situations where multiple motors are involved, the use of deep reinforcement networks may be particularly advantageous due to the ability to optimize the efficiency and/or reliability of the entire system of multiple motors simultaneously. This may be particularly true where, in some situations, a set of individually optimized motors operating within an OOA specific to each motor may actually wind up being less efficient because each motor controller is oblivious to the amount of time each motor is actually activated over the course of a day (as in a system of motors driving air handlers controlled by a time of day thermostat system). In various implementations involving multiple motors like those disclosed herein, the various motors could be located in the same physical location/site/plant. In other implementations, the multiple motors could be located in different physical locations/sites/plants but act as a collective system.

Figure 5:
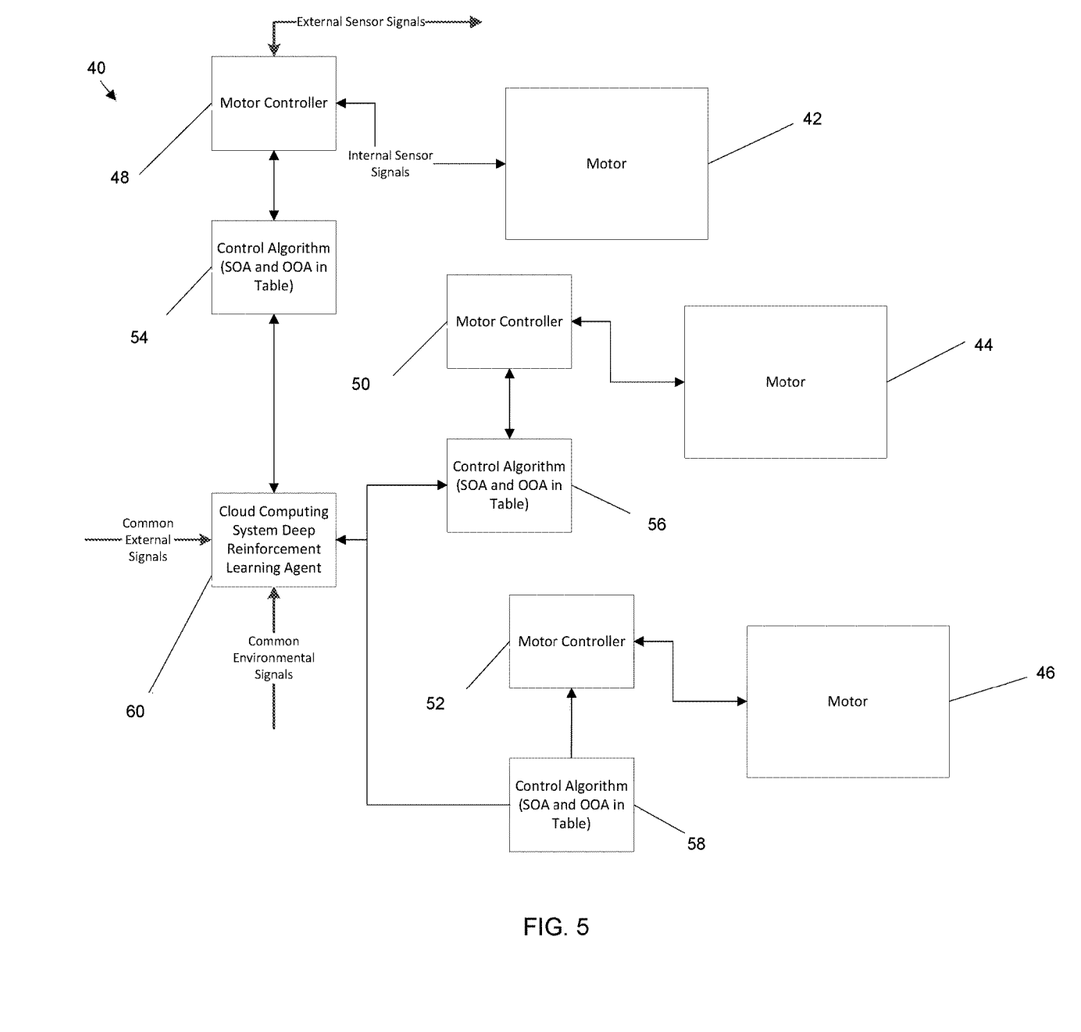
FIG. 5 is a block diagram of an implementation of a motor control system where multiple motors and motor controllers are operatively coupled with a deep reinforcement learning agent in a cloud computing system showing various sensor inputs.

Referring to FIG. 5, an implementation of a motor system 40 is illustrated that includes multiple motors 42, 44, 46 operatively coupled to multiple motor controllers 48, 50, 52 and memories 54, 56, 58. Like the systems illustrated in FIGS. 2-4, a cloud computing system 60 is coupled with the motor controllers 48, 50, 52 via telecommunication network and receives data from external sensor signals and/or internal sensor signals that relate to the operation of each of the motors 42, 44, 46 (the sensors are only shown for the first motor in FIG. 5 for brevity). As illustrated, the cloud computing system 60 can also receive, in various implementations, additional sensor signals from the environment, such as, by non-limiting example, temperature outside a building housing the motors, water temperature in a city, or any other environmental parameter surrounding the motor system 40. The cloud computing system 60 can also receive common external signals that affect all of the motors 42, 44, 46 simultaneously, such as, by non-limiting example, power factor, power quality, incoming line voltage, incoming voltage phase, incoming phase current, or any other operating parameter of the motors 42, 44, 46. As illustrated, the cloud computing system 60 takes the data it receives and then generates a deep reinforcement learning agent like any disclosed here and uses the deep reinforcement learning agent to generate a set of control parameters for each motor

42, 44, 46 that establishes an OOA for each motor and then transmits the set of control parameters to the motor controllers 48, 50, 52 for storage and use in the memories 54, 56, 58. In this way, the deep reinforcement learning agent is able to create individualized OOAs for each motor based on observing the operation of each motor individually and the combination of the motors' operation as a whole. In the system implementation 40 illustrated in FIG. 5, the particular motor controllers 48, 50, 52 are each like the system 10 of FIG. 2 where each motor controller 48, 50, 52 stores its individualized set of control parameters that define the OOA in its respective memory 54, 56, 58 and then uses those parameters going forward.

Figure 6:
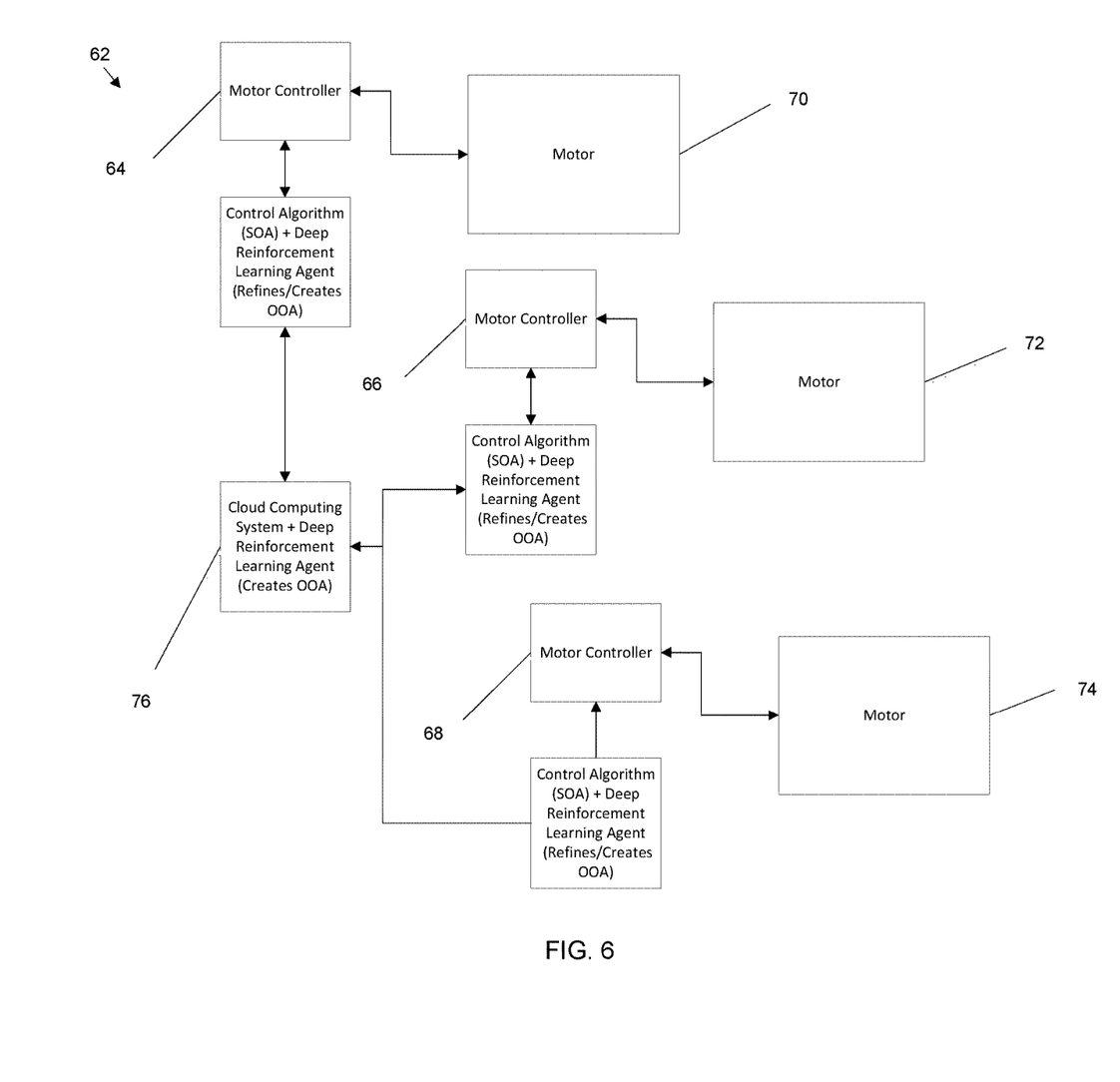
FIG. 6 is a block diagram of an implementation of a motor control system involving multiple motors and motor controllers where the memory associated with each motor controller include a deep reinforcement learning agent and the cloud computing system further comprises a second deep reinforcement learning agent.

Referring to the system 62 illustrated in FIG. 6 however, the individual motor controller/motor pairs are like those illustrated in FIG. 3 or in FIG. 4, where each motor controller 64, 66, 68 is designed to refine and/or create the set of control parameters that define the OOA for each motor 70, 72, 74 whether in combination with the cloud computing system 76 or independently (in some implementations). In this system implementation, the use of ensemble learning/modeling by the cloud computing system itself, or in combination with the each of the first deep reinforcement learning agents operated by each motor controller 64, 66, 68, may allow the system to more rapidly determine the set of control parameters for each motor that define the OOA. Also, the use of layered deep reinforcement learning agents in a one-to-many configuration may allow the system 62 to take advantage of the collective computing power of all of the motor controllers 64, 66, 68 themselves to assist with the optimization. A wide variety of possibilities of systems and deep reinforcement agents may be constructed using this disclosure.

In some implementations, one, some, or all of the motor controllers may operate using a set of localized OOA control parameters, and periodically (either on a predetermined basis or on a determinable basis [in the case of an event or set of events that are noted to cause motor operation out of the OOA]) may check in/connect with the cloud computing system to receive updates to the set of located OOA control parameters. In some implementations, adjustments to the SOA parameters could be carried out using this process as well. Also, in some implementations, when a physical parameter/characteristic of the motors has been identified as being/causing a systemic shift in the OOA for a particular set of motors, the cloud computing system may be used to correspondingly adjust the set of control parameters associated with the OOA for all the affected motors simultaneously (or as each motor connects to the cloud computing system periodically). For example, an HVAC blower manufacturer may learn/observe that a particular batch of magnets used in a set of blower motors is 10% less tolerant to high operating temperatures. While the current set of control parameters for the SOA for these motors ensures that the motors would continue to operate safely, the set of control parameters for the OOA for these motors may not yet comprehend this high operating temperature effect (if the blower motors were newly installed or none had been in a high operating temperature situation yet). With this information, the HVAC manufacture may be able to use the cloud computing system to perform a proactive manual adjustment of the set of control parameters associated with the OOA for each of these specific motors (or just those motors noted to be operating in higher operating temperatures) to ensure they operate optimally according to desired efficiency/reliability conditions.

A wide variety of system parameters that involve each motor in a multi-motor system may be used to train/generate/operate deep reinforcement learning models like those disclosed herein, such as, by non-limiting example, incoming electrical voltage to each motor, alignment of current phases to each motor, alignment of voltage phases to each motor, incoming electrical voltage to a power factor controller, alignment of current phases from an electrical panel coupled with a power factor controller, alignment of voltage phases from an electrical panel coupled with a power factor controller, ambient temperature, ambient humidity, motor phase voltages for each motor, motor current per voltage phase applied to each motor, calculated instantaneous phase power from the motor controller for each motor, each motor's speed, each motor's acceleration rate, each motor's torque, position of a rotor comprised in each motor, position of a stator comprised in each motor, temperature of a magnet comprised in a rotor comprised in each motor, magnetic field of a magnet comprised in a rotor comprised in each motor, a magnetic field of a component in each motor, a magnetic field in each motor, temperature of a casing of each motor, mechanical vibration of a casing of each motor, mechanical vibration of a shaft of each motor, airflow speed adjacent to each motor, fluid pressure surrounding each motor, winding temperature of each motor, each motor's power factor, each motor's stator winding temperature, a temperature of a power semiconductor device comprised in each motor, a control board temperature of each motor, a control board component temperature of each motor, a vibration of the control board of each motor, a vibration of a component of the control board of each motor, a temperature of the motor controller of each motor, a vibration of the motor controller of each motor, a position of a rotor relative to a stator of each motor, any combination thereof, and any other parameter used to control each, any, or all of the motors in the system. The cost functions used to optimize efficiency/failure/reliability may also be adjusted to focus on each motor or each motor's components in the context of the overall system.

Figure 7:
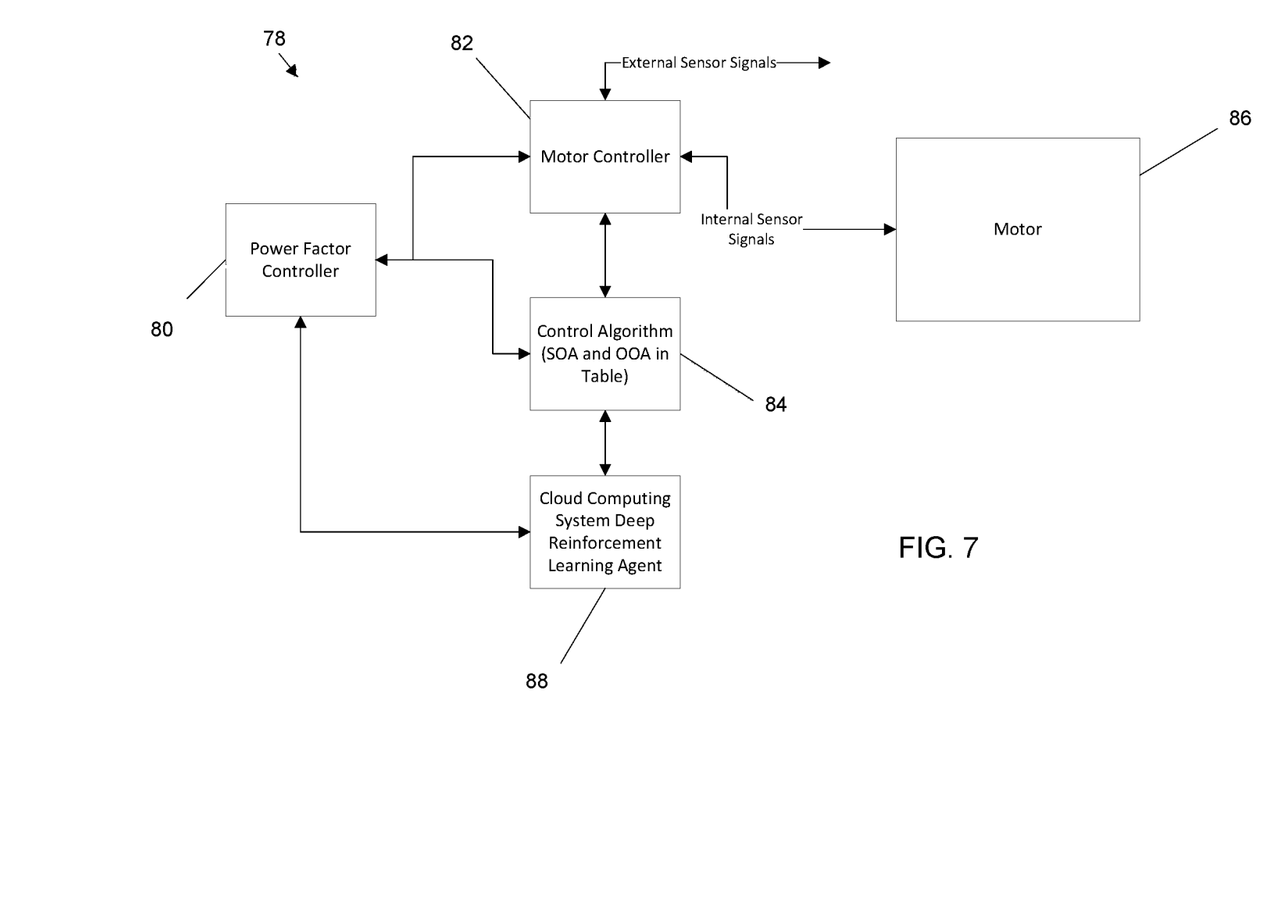
FIG. 7 is a block diagram of an implementation of a motor control system coupled bidirectionally with a power factor controller.

In the system implementations illustrated in in FIGS. 1-6, the motor controllers have been illustrated as performing all control and sensing functions associated with the operation of the motor. In various implementations, however, other control systems may engage with or provide instructions to the motor controllers to allow the controllers to handle various external/environmental factors. Referring to FIG. 7, an implementation of a system 78 that employs a power factor controller 80 coupled with motor controller 82 and/or memory 84 is illustrated. The power factor controller 80 monitors various incoming electrical power parameters that can affect the operation of the motor 86. As illustrated, the motor controller 82 is coupled to cloud computing system 88. The cloud computing system 88 in the implementation illustrated in FIG. 7 can train/generate a deep reinforcement learning agent like any disclosed in this document and then transmit a set of control parameters that define an OOA to the motor controller 82 across a telecommunication network for storage in memory 84. As illustrated, in some implementations, the power factor controller 80 may also be coupled with the cloud computing system 88. During operation of the system 78, the power factor controller 80 and the motor controller 82 are coupled and communicate bidirectionally, meaning that data communication/instructions can flow between both the power factor controller 80 and the motor controller 82. Using data from external sensor and/or internal sensors the cloud computing system 88 trains a deep reinforcement learning model that determines a set of control parameters associated with an OOA for the motor 86. In some implementations, the cloud computing system 88 also uses data from the power factor controller 80 in the training of the deep reinforcement learning model. The resulting set of control parameters may, in some implementations, allow the motor controller 82 to send instructions to the power factor controller 80 and vice versa depending on the operating conditions detected. For example, the power factor controller may provide one or more instructions to the motor controller in response to the line power event (under voltage, over voltage, phase voltage deviation, etc.) and the motor controller uses those instructions and the OOA control parameters to maintain the motor's operation in the optimized operating area. In some situations, the motor controller can then, with the information from the power factor controller, provide instructions to the power factor controller to ask the power factor controller to take certain actions to help the motor controller maintain the motor 86 in the OOA during the event. A wide variety of parameters may be used in system that employ a power factor controller, including those previously discussed, to assist in developing the set of control parameters used to establish the OOA for the motor (and for multiple motors coupled to a power factor controller using the principles previously discussed).

In places where the description above refers to particular implementations of systems for optimization and/or control of a system and implementing components, sub-components, methods and sub-methods, it should be readily apparent that a number of modifications may be made without departing from the spirit thereof and that these implementations, implementing components, sub-components, methods and sub-methods may be applied to other systems for optimization and/or control of a system.

What is claimed is:

1. A system configured for operation of a motor, the system comprising:
    a motor controller coupled with a memory, the motor controller configured to be coupled with a motor; and
    a power factor controller coupled with the motor controller;
    wherein the motor controller is configured to store a set of control parameters in the memory, the set of control parameters generated using a deep reinforcement learning agent and data associated with one or more parameters of the motor;
    wherein the set of control parameters are configured to define an operating area for the motor;
    wherein the power factor controller and the motor controller communicate bidirectionally; and
    wherein the deep reinforcement learning agent is trained using data from the power factor controller.

2. The system of claim 1, wherein the motor controller is configured to be coupled with a telecommunication network and wherein the telecommunication network is configured to be operatively coupled with a cloud computing system which is configured to comprise the deep reinforcement learning agent and use the deep reinforcement learning agent and the data associated with the one or more parameters of the motor to generate the set of control parameters and then communicate the set of control parameters across the telecommunication network to the motor controller for storing in the memory.

3. The system of claim 1, wherein the deep reinforcement learning agent is comprised in the memory and the motor controller is configured to use the deep reinforcement learning agent and the data associated with one or more parameters of the motor to generate the set of control parameters.

4. The system of claim 1, wherein the deep reinforcement learning agent is comprised in the memory and is configured to communicate with a cloud computing system over a telecommunication network coupled with the motor controller where the cloud computing system is configured to use the data associated with one or more parameters of the motor to generate a set of agent control parameters used by the deep reinforcement agent to generate the set of control parameters associated with the operating area for the motor.

5. The system of claim 1, further comprising two or more motor controllers each coupled with a memory and each configured to be coupled with a corresponding motor,
    wherein the memory coupled with each motor controller comprises a set of control parameters for that motor controller where the set of control parameters define an operating area for the corresponding motor, and wherein the set of control parameters for each motor controller is determined by executing a second deep reinforcement learning agent using data associated with one or more parameters of each motor associated with each motor controller.

6. The system of claim 1, wherein the deep reinforcement learning agent is one of a deep Q-network, a double deep Q-network, an Actor-Critic agent, a policy gradient agent, a Monte Carlo tree search agent, an imitation learning agent, or any combination thereof.

7. The system of claim 1, wherein the deep reinforcement learning agent is generated using a deep neural network and a Markov decision process.

8. The system of claim 1, wherein the motor controller is configured to use the set of control parameters to provide one or more instructions to the power factor controller and wherein the power factor controller is configured to use the set of control parameters to provide one or more instructions to the motor controller.

9. A method of controlling a motor, the method comprising:
    providing a motor controller coupled with a memory, the motor controller coupled with a power factor controller, the motor controller also configured to be coupled with a motor; and
    storing a set of control parameters in the memory, the set of control parameters generated using a deep reinforcement learning agent and data associated with one or more parameters of the motor;
    wherein the set of control parameters are configured to define an operating area for the motor;
    wherein the power factor controller and the motor controller communicate bidirectionally; and
    wherein the deep reinforcement learning agent is trained using data from the power factor controller.

10. The method of claim 9, wherein the motor controller is configured to be coupled with a telecommunication network and wherein the telecommunication network is configured to be operatively coupled with a cloud computing system which is configured to comprise the deep reinforcement learning agent and use the deep reinforcement learning agent and the data associated with the one or more parameters of the motor to generate the set of control parameters and then communicate the set of control parameters across the telecommunication network to the motor controller for storing in the memory.

11. The method of claim 9, wherein the deep reinforcement learning agent is comprised in the memory and the motor controller uses the deep reinforcement learning agent and the data associated with one or more parameters of the motor to generate the set of control parameters.

12. The method of claim 9, wherein the deep reinforcement agent is comprised in the memory and is configured to communicate with a cloud computing system over a telecommunication network coupled with the motor controller where the cloud computing system uses the data associated with one or more parameters of the motor to generate a set of agent control parameters used by the deep reinforcement agent to generate the set of control parameters associated with the operating area for the motor.

13. The method of claim 12, further comprising at least a second deep reinforcement agent configured to use the set of agent control parameters to generate a portion of the set of control parameters associated with the operating area for the motor.

14. The method of claim 9, wherein the deep reinforcement learning agent is one of a deep Q-network, a double deep Q-network, an Actor-Critic agent, a policy gradient agent, a Monte Carlo tree search agent, an imitation learning agent, or any combination thereof.

15. The method of claim 9, wherein the deep reinforcement learning agent is generated using a deep neural network and a Markov decision process.

16. The method of claim 9, wherein the motor controller uses the set of control parameters to provide one or more instructions to the power factor controller and wherein the power factor controller uses the set of control parameters to provide one or more instructions to the motor controller.

17. A system configured for operation of a motor, the system comprising:
  a motor controller coupled with a memory, the motor controller configured to be coupled with a motor; and
  a power factor controller coupled with the motor controller;
  wherein the motor controller is configured to store a set of control parameters in the memory, the set of control parameters generated using a deep reinforcement learning agent and data associated with one or more parameters of the motor;
  wherein the set of control parameters are configured to define an operating area for the motor;
  wherein the power factor controller and the motor controller communicate bidirectionally;
  wherein the deep reinforcement learning agent is trained using data from the power factor controller; and
  wherein the motor controller uses the set of control parameters to provide one or more instructions to the power factor controller.

18. The system of claim 17, wherein the motor controller is configured to be coupled with a telecommunication network and wherein the telecommunication network is configured to be operatively coupled with a cloud computing system which is configured to comprise the deep reinforcement learning agent and use the deep reinforcement learning agent and the data associated with the one or more parameters of the motor to generate the set of control parameters and then communicate the set of control parameters across the telecommunication network to the motor controller for storing in the memory.

19. The system of claim 17, wherein the set of control parameters are generated using the deep reinforcement learning agent and a second deep reinforcement learning agent.

20. The system of claim 19, wherein the set of control parameters are configured to define an operating area for a single motor.

* * * * *